(12) United States Patent
Koppelaar et al.

(10) Patent No.: US 9,305,455 B2
(45) Date of Patent: Apr. 5, 2016

(54) SWITCH MODULE AND LIGHTING CONTROL SYSTEM COMPRISING THE SWITCH MODULE

(75) Inventors: Arie Geert Cornelis Koppelaar, Glessen (NL); Oswald Moonen, Eindhoven (NL); Emmanuel David Lucas Michael Frimout, Nuenen (NL); Ewout Brandsma, Eindhoven (NL); Gert-Jan Koolen, Aarle Rixtel (NL)

(73) Assignee: NXP B.V., Eindhoven (NL)

( * ) Notice: Subject to any disclaimer, the term of this patent is extended or adjusted under 35 U.S.C. 154(b) by 961 days.

(21) Appl. No.: 13/384,175

(22) PCT Filed: Jul. 20, 2010

(86) PCT No.: PCT/IB2010/053300
§ 371 (c)(1),
(2), (4) Date: Feb. 27, 2012

(87) PCT Pub. No.: WO2011/010283
PCT Pub. Date: Jan. 27, 2011

(65) Prior Publication Data
US 2012/0146765 A1 Jun. 14, 2012

(51) Int. Cl.
*G05B 19/00* (2006.01)
*G08C 17/02* (2006.01)
(Continued)

(52) U.S. Cl.
CPC .............. *G08C 17/02* (2013.01); *H04L 12/282* (2013.01); *H05B 37/0272* (2013.01); *H05B 39/088* (2013.01); *H04L 2012/2841* (2013.01)

(58) Field of Classification Search
CPC ............ G05B 19/0421; H05B 37/029; H05B 37/0272; H05B 39/088; G08C 2201/50; G08C 2201/51; G08C 2201/40; G08C 17/02; H04L 12/282

USPC .......... 340/3.1, 3.2, 3.3, 3.31, 3.32, 3.5, 3.52, 340/3.53, 3.54, 3.9, 4.2, 4.21, 4.3, 5.1, 5.61, 340/9.1, 9.11, 9.13, 9.14, 9.15, 539.1, 340/539.22, 540
See application file for complete search history.

(56) References Cited

U.S. PATENT DOCUMENTS 5,059,871 A * 10/1991 Pearlman et al. .............. 315/316
5,544,037 A * 8/1996 Luger ............................. 700/17
(Continued)

FOREIGN PATENT DOCUMENTS

CN 2901450 Y 5/2007
CN 1980514 A 6/2007
(Continued)

OTHER PUBLICATIONS

International Search Report for Patent Application No. PCT/IB2010/053300 (Nov. 15, 2010).

*Primary Examiner* — Steven Lim
*Assistant Examiner* — Mancil Littlejohn, Jr.
(74) *Attorney, Agent, or Firm* — Rajeev Madnawat

(57) ABSTRACT

A switch module is designed to facilitate user definition of a group of switch modules that control the same lamp. A lamp unit (12) containing the lamp responds selectively to messages from the switch modules (10, 10') when the messages comprise ID information matching with ID information stored in the lamp unit (12). A group is formed by detecting user control operation of sensors (100) in the switch modules (10, 10'), transmitting messages from the switch modules (10, 10') in response and determining from the messages whether the switch modules (10') have both been operated within a time interval with a duration of less than a predetermined threshold. If so, the ID information value in memories (104) of the switch module (10) and/or the further switch module (10') are set to matching ID values, for use in the messages to control the lamp unit.

19 Claims, 2 Drawing Sheets

(51) Int. Cl.
*H04L 12/28* (2006.01)
*H05B 37/02* (2006.01)
*H05B 39/08* (2006.01)

(56) References Cited

U.S. PATENT DOCUMENTS 8,049,434 B2 * 11/2011 Crouse et al. .................. 315/291
2007/0080823 A1 4/2007 Fu et al.
2007/0205670 A1 9/2007 Chang
2007/0297354 A1 * 12/2007 Ishiyama et al. .............. 370/310
2012/0098428 A1 4/2012 Koppelaar et al.

FOREIGN PATENT DOCUMENTS

| | | |
|---|---|---|
| FR | 2 877 474 A1 | 5/2006 |
| GB | 2 390 204 A | 12/2003 |
| GB | 2390204 A * | 12/2003 ............. G08C 17/00 |

* cited by examiner

SWITCH MODULE AND LIGHTING CONTROL SYSTEM COMPRISING THE SWITCH MODULE

FIELD OF THE INVENTION

The invention relates to a switch module for use in a lighting control system, a lighting control system comprising such a switch module and a method of operating a lighting control system.

BACKGROUND OF THE INVENTION

US patent application No. 2007/205670 describes the use of a home network to control lamps and other devices in the home. The use of a multi-way switch group is described, with a plurality of switches that are used to control the same lamp. A user interface is provided that has a display on which the user can select the switches that will be part of the multi-way switch group. Based on this selection, a multi-way message packet is transmitted to inform the switches of the membership of the multi-way switch group. Upon reception of such a message packet the relevant switches copy the setting state specified by the message packet.

The home network of US2007/205670 has the disadvantage that it requires selection of the multi-way group via a user interface. This requires overhead costs, and it may make installation too complex for many consumers without technical skills.

US patent application No. 2007/080823 describes a home network with switches that communicate with lamps via a wireless home network. A method of "pairing" switches and lamps is described (i.e. establishing which specific lamps will respond to messages from a specific switch). Pairing involves making a selected lamp receptive to a pairing request message and transmitting the pairing request message from a switch. When this happens the selected lamp responds by copying ID information from the pairing request message. Subsequently the lamp only responds with command messages with this ID.

The system of US2007/080823 does not describe pairing with a group of switches. Arguably, one could imagine that a lamp could be paired to a group of devices by using successive messages to send ID information of different switches to the lamp, so that the lamp can store the ID information for each of these switches. But this would require users to perform a complex installation, which may be too complex for many consumers without technical skills.

SUMMARY OF THE INVENTION

Among others, it is an object to provide for a method and devices to facilitate simple installation of multi-way groups of switch modules in a lighting control system.

A switch module according to claim 1 is provided. This switch module has a memory with an ID information value that is used as a source of ID information for use in lamp control messages, to enable lamps to determine whether they should respond to the messages.

The switch module has a processing circuit that updates the ID information value in the memory and/or causes an update of the ID information value in the memory of a further switch module when it is detected that the user operates the switch modules nearly simultaneously, that is, within a time interval of at most a predetermined duration. A combination of detection of user operation of the switch module and reception of a message reporting the user operation of the further switch module is used to detect this. The update of the ID information is used to provide for corresponding group ID information in the lighting control messages from the switch module and the further switch module. Because of this, a lamp unit can subsequently be controlled by messages from each of these switch modules. The user can easily control updates to corresponding group ID information by operating the switch modules in close temporal sequence to indicate that they must form a group.

The switch module may be implemented in an integrated circuit with an input for coupling to a sensor for detecting user operation, such as a switch, or it may comprise a circuit and a sensor coupled to that circuit.

In an embodiment, the update of the ID information is performed only in response to a special type of operation by the user, by which the user can indicate a desire to form a group. A dedicated switch may be provided in the switch module for example, or the special operation may be detected from a temporal pattern of operation of the switch or from operation of a combination of switches, for example. In this embodiment, detection of the special type of operation is used to enable the update. In a further embodiment the switch module may send a message indicating that this special type of operation has occurred and/or it may make the update dependent on whether it has received such a message within a predetermined time distance from when it was operated by a user. In this way, the risk of accidental group formation may be reduced.

The common group ID information may be realized by executing corresponding group ID selection protocols in the switch module and the further switch module that have been operated by the user within the time interval of predetermined duration. To enable this, each switch module preferably sends a message upon actuation of the sensor, optionally indicating the use of the special type of operation. Inherent properties of the messages, such as their relative timing or information content are used in the group ID selection protocol to select the group ID information in the same way in all involved switching modules. Thus the need for additional messages is reduced.

In an embodiment a switch module and/or a lamp unit may monitor received messages to detect conditions where other switch modules may execute an update of an ID information value. When this is detected, and the detecting switch module or lamp unit has a corresponding ID information value the detecting switch module or lamp unit may execute the group ID selection protocol on the messages to update its own ID information value. In this way, groups can be easily expanded.

The common group ID information may be realized by copying ID information of the further switch module into the memory of the switch module wherein the nearly simultaneous user operation is detected. Alternatively, the ID information of this switch module may be copied to the further switch module.

In an embodiment the switch module is configured to transmit an update message for example to report that it changes its ID information value and/or to command one or more other switch modules to change their ID information value. Such an update message may specify the old and new ID information value. The switch module may be configured to respond to such an update message to update its ID information value. This may serve to enable other switch modules that already belong to a group to keep together as a group, even if the common group ID information is changed. The update message may also be used by a lamp unit to remain paired to a switch module or a group of switch modules when its ID information value is changed because it is joined to a group.

In an embodiment switch module may receive a command to make the switch module leave a group. Such a command may involve user selection of a reset button on the switch module for example. The switch module may respond by changing the ID information value in its memory. In a further embodiment this is disabled when a count of switch modules in the relevant group indicates that the switch module is alone in the group. This it is ensured that one switch module will always remain to control any lamp units paired to the group. For example when the lamp units are paired at installation of a lamp, this avoids to need to reinstall lamps.

BRIEF DESCRIPTION OF THE DRAWINGS

These and other objects and advantageous aspects will become apparent from a description of exemplary embodiments, using the following Figures.

DETAILED DESCRIPTION OF EXEMPLARY EMBODIMENTS

Figure 1:
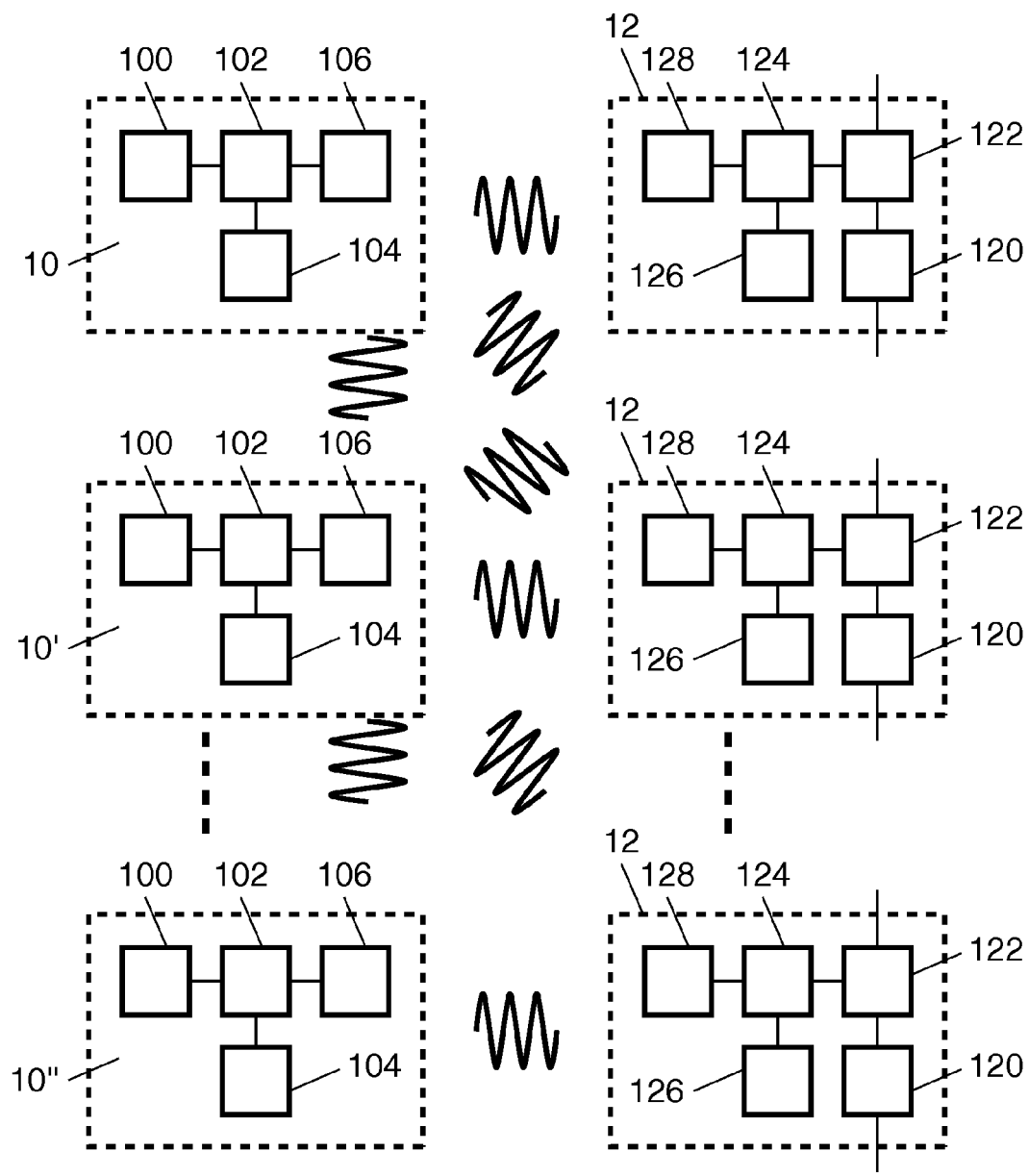
FIG. 1 shows a lighting control network

FIG. 1 shows a lighting control network with a plurality of switch modules 10, 10', 10" and lamp units 12. Although three switch modules 10, 10', 10" are shown, it should be appreciated that different numbers may be used, also the number of lamp units need not equal the number of switch modules. Each switch module 10, 10', 10" is provided with a switch sensor 100 for detecting actuation by a user, a processing circuit 102, a memory 104 and a transceiver 106. Processing circuit 102 is coupled to switch sensor 100, memory 104 and transceiver 106. Processing circuit 102 may comprise a programmable micro-controller and a program memory with a program that configures the micro-controller to perform the functions of processing circuit 102.

Each lamp unit 12 comprises a light producing device 120, a current control device 122, a processing circuit 124, a memory 126 and a receiver 128. Transceiver 106 and receiver 128 may be configured to transmit wireless messages (e.g. messages modulated onto RF signals or infrared signals). Light producing device 120 and current control device 122 are coupled in series between the power lines. Current control device 122 may be a controllable switch for example: the words "current control" refer to an ability to change the amount of current and not necessarily to regulate the current to a set value. The processing circuit 124 is coupled to current control device 122, memory 126 and the receiver 128. Processing circuit 124 may comprise a programmable micro-controller and a program memory with a program that configures the micro-controller to perform the functions of processing circuit 124.

After installation processing circuits 102 of switch modules 10 operate to detect user actuation, i.e. user control operation, of switch sensors 100 by which a human user signals a desired change of lighting and to respond to detection by controlling transceiver 106 to transmit a message containing ID information read from memory 104. Receivers 128 receive these messages and trigger the processing circuits 124 of lamp units 12 to compare the ID information from the messages with ID information stored in the memories of lamp units 12. When the ID information from the received message and the ID information from the memory 126 in a lamp unit 12 match, the processing circuit 124 of the lamp unit 12 changes the control signal of current control device 122 according to the message.

Different switch modules 10, 10' may be organized to form a group, by storing the same matching ID information for use in the messages in memory 104 of each of the switch modules 10, 10' of the group. A group may be used to provide for control of a same lamp unit 12 from a plurality of switch modules 10, 10'. A lamp unit 12 may provide for toggle switching for example, switching the current to the light producing device on and off, when it is off and on respectively, when a message with matching ID information is received from any switch module 10 of a group. Because different switch modules may use the same ID information, actuation of any of these switch modules 10, 10' can be used to toggle lighting on and off.

Figure 2:
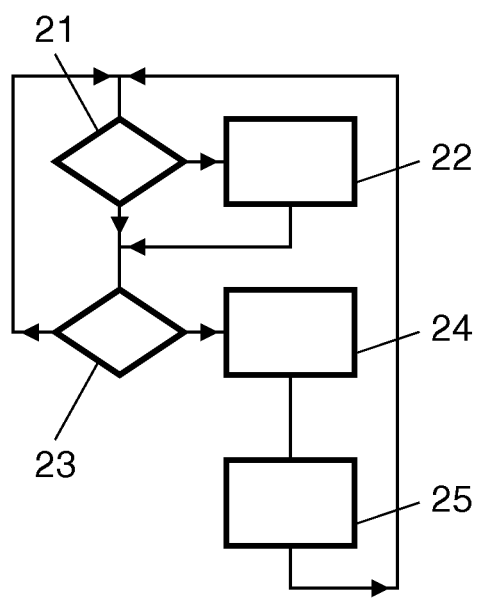
FIG. 2 shows a flow-chart of establishment of a group of switch modules

FIG. 2 shows a flow chart of a process to establish equal ID information in a group of switch modules 10, 10'. Switch modules 10, 10', 10" are designed to perform this process to minimize the amount of technical skill needed to program equal ID information in a group of switch modules.

In a first step 21 processing circuit 102 tests whether the switch sensor 100 of its switch module 10 has been actuated. If so, processing circuit 102 executes a second step 22 wherein it causes transceiver 106 to transmit a message containing current ID information from memory 104. In addition processing circuit 102 defines a time interval in which it is open to group forming, for example by recording an indication of the actuation in combination with a time count from the time of actuation. The time count may be read from a time counter in processing circuit 102 for example, or processing circuit 102 may execute a step to increase the time count value periodically. If no actuation is detected, second step 22 is skipped.

After second step 22, processing circuit 102 executes a third step 23 wherein it tests whether transceiver 106 has received a message from another switch module 10' indicating that sensor 100 of the other switch module 10 has been actuated. Furthermore, also in third step 23 processing circuit 102 uses the message to test whether a duration of the time interval between the actuations in its own switch module 10 and the other switch module 10' is below a threshold duration defining said time interval. Timing of the actuation may be inferred from the time count at reception of the message, or from a time count in the message for example. If the duration does not exceed the threshold processing circuit 102 executes a group ID information selection protocol in a fourth step 24 and it executes a fifth step 25 to update the ID information in memory 104 using the result of the group ID information selection protocol. From there the process may return to first step 21. Also if third step 23 shows no timely received message the process may return to first step 21.

The group ID information selection protocol in fourth step 24 serves to ensure that switch modules 10, 10' will select common ID information once this step is reached. Various types of protocols may be used. In one embodiment a protocol is used wherein the switch modules 10, 10' select the common ID information without using further messages to reach a selection. Alternatively an interactive protocol may be used, in which the switch modules 10, 10' involved in the selection use further messages to "negotiate" to decide on common ID information.

Protocols that do not require further messages to reach a selection have the advantage that message traffic is reduced, but they need to be designed to ensure that all switch modules 10, 10' involved in the selection process will independently select the same ID information for subsequent use. To ensure this, a protocol is preferably used that selects a proposed ID value based only on inherent properties of the messages of second step 22 and third step 23, such as group ID information used in those messages and/or relative timing of the messages. A bias based on non-inherent information such that a message is the own transmitted message should be avoided.

In a simple example, processing circuit 102 selects the proposed ID from the messages of second step 22 and third step 23 that has the most recent time of transmission. This results in an implementation wherein processing circuit 102 changes the group ID information only if the switch module 10 received the message of third step 23 after transmission of the message of second step 22. Thus, the ID information is used from the most recent one of a plurality of messages that is transmitted in a time interval of predetermined duration.

It should be appreciated that this is only one example of a protocol that selects a proposed ID based on properties of the messages without bias for properties of its own transmitted message. Instead of the ID information from the most recent message, ID information from the oldest one of the messages of second step 22 and third step 23 may be used.

In other embodiments, the ID information from the messages may be used to determine the selection. For example, the proposed ID information may be selected on the basis of the lowest ID information value of the messages that were received in the time interval with the predetermined length (e.g. the messages of second and third step 22, 23). In another example, the ID information values may be set so that it can be detected from the ID information value whether it is used for a group of possibly more than one switch module. Group ID information values may be formed for example from native ID information of the switch modules, combined with information indicating that the group ID information is used for a group of more than one switch module 10. In this case the proposed ID information may be the lowest non-native ID information value, if any, from the messages and failing any such non-native ID information value, a new group ID information generated from the lowest native ID information value from the messages overall. Thus, changing ID information values for groups can be minimized. Of course any predetermined form of ordering may be used to select between ID information values, instead of lowest ID values.

These are examples of group ID information selection protocols that enable different switch modules 10 to acquire consistent ID information in their respective memories 104 for use to form subsequent messages without a negotiation between switch modules. They exemplify the principle of using inherent properties of the messages in fourth step 24 in the switch module 10, i.e. properties of the messages that are used irrespective of the bare fact whether the message was sent or transmitted by the switch module 10. Any predetermined function may be used to compute the proposed ID value from properties of the messages.

When ID information in a switch module 10, 10' for use in messages from that switch module is changed, it may be desirable to update ID information in other switch modules 10" than the switch modules 10, 10' that send the messages and/or in lamp units 12 as well. For example, when there is already a group of switch modules 10, 10" with the same ID information, and one of the switch modules 10 in the group updates its ID information, it may be desirable that the others do so as well. This makes it possible to create larger groups without much work from the user. Similarly, it may be desirable that a lamp unit 12 that is set to respond to the ID information of a switch module 10 changes its ID information when the switch module 10 changes its ID information. This also reduces the work for the user.

In an embodiment the processing circuits 102 of all switch modules 10, 10', 10" may be configured to monitor whether they receive messages from other switch modules 10" that will lead those other switch modules 10" to change the ID information, according the process shown in FIG. 2. Thus, processing circuit 102 may be configured to perform a first step of testing for messages from other switch modules 10" received within less than a predetermined time distance from each other. The processing circuit 102 may be configured to respond to detection of such messages by performing a second step, testing whether the ID information in the memory 104 of its switch module 10 matches the ID information from one of those messages. If so, the processing circuit 102 executes the same group ID selection protocol as in fourth step 24 of FIG. 2, applied to the received messages and updates the group ID information in the memory 104 of its switching module 10 according to the result of the protocol. Because all relevant switch modules 10 execute the same group ID selection protocol, this will make them acquire consistent ID information values.

In an embodiment the processing circuit 102 of a switch module 10 may be configured to transmit an update message that specifies a need to update ID information values in other switch modules 10 and/or in one or more lamp units 12. In an embodiment the update message specifies the group ID information of the old and new groups. The update message, with an old ID information value and a new ID information value, may be transmitted to command all devices that have the old ID information value to change that ID information value to the new ID information value. The processing circuits 102 of the switch modules 10 may be configured to respond to such an update message by testing whether their current ID information matches the old ID information from the update message and, if so, by replacing it with the new group ID information from the update message.

In one embodiment the processing circuit 102 may be configured to transmit an update message for its old ID information value if the protocol of fourth step 24 results in a change of that ID information value. In another embodiment, the processing circuit 102 may be configured to transmit an update message for the old ID information value of the other switch module 10 if the protocol of fourth step 24 results in a change of that ID information value, using the ID information value derived from the received message of third step 23.

Although an example has been shown of a change of group ID information value when two switch modules transmit messages nearly simultaneously, it should be appreciated that in a further embodiment processing circuits 102 may be configured to select common group ID information for all, possibly more than two, switch modules 10, 10' that have transmitted messages in response to actuation in a time window of predetermined length.

The process of FIG. 2 may be continuously operative to respond to any messages, but in an embodiment it may be executed only during time intervals of limited length (e.g. one minute) started by a trigger signal to start a group ID information establishment process. Any trigger signal may be defined. For example a dedicated actuation sensor (e.g. a separate switch, not shown) may be provided on switch module 10 to trigger this process. In another embodiment processing circuit 102 may be configured to detect a predetermined pattern of actuation of sensor 100 and to trigger this process in response to detection of such a pattern (e.g. touching sensor 100 repeatedly at least a predetermined number of times with less than a predetermined time interval in between or within a predetermined time interval, keeping in touch with sensor 100 for more than a predetermined time period, or touching it with a predetermined pattern of long and short touches). In an embodiment wherein the switch module 10 has multiple sensors, for example to detect commands to switch a light on and off respectively, detection of patterns a combined pattern of actuations may be detected to trigger the process.

When the group ID information establishment process is started by a trigger signal, first step 21 may be configured to use detection of the trigger signal instead of just any actuation of sensor 100. Second step 22 may comprise transmitting a message that contains information indicating detection of the trigger signal. A message with such information will be called a "join request" message. Similarly, third step 23 may impose an additional condition to proceed to fourth step 24, the condition requiring reception of a message from the other switch module 10 is such a join request message.

A process may be used wherein these modified first and third steps 21, 23 are both used, so that group ID information will be executed only when all participating switch modules 10 have transmitted join request messages. This minimizes the risk of unintended joining into a group. Alternatively, a process may be used wherein the process continues to fourth step 24 both when it has detected a trigger signal or it has received a join request within a predetermined time interval of detecting any actuation of sensor 100. As an alternative only part of the switch modules 10 may be constructed to detect trigger signals, other switch modules proceeding to fourth step 24 upon reception of a join request within a predetermined time interval of detecting any actuation of sensor 100. Thus this part of the switch modules 10 may be less complicated than others.

Although an embodiment has been shown wherein messages are sent from both switch modules 10, 10' that are operated by the user when the user causes the update, it should be appreciated that alternatively only one of the switch modules 10' may send such a message, if the other one 10 sends one or more update messages reporting the result of its ID information selection protocol, i.e. the (each) old ID information that must be updated and the new ID information. In an embodiment wherein the ID information is changed only in one switch module 10, when it copies ID information from a message (preferably a join request message) from another switch module 10', message transmission from this one switch module 10 could even be dispensed with, in general or when this switch module 10 changes from its native ID information value, if it is acceptable that lamp units 12 may need to be (re-)programmed later.

Any pairing protocol may be used to pair lamp units 12 and switch modules 10, 10', 10". For example, the processing circuit 124 of a lamp unit may set the ID information in its memory 126 based on ID information from the first received message after application of a initialization signal to the lamp unit 12 (e.g. by actuating an initialization switch (not shown) on lamp unit 12), or after installation of the lamp unit 12. In an embodiment, pairing with lamp units 12 is performed only after group ID identifications have been established. In this case, no special measures need to be taken in lamp units 12 to account for group formation. More generally, if a group of switch modules 10 is expanded without changing the group ID information that is paired to a lamp unit 12, expansion of the group may take place after pairing. This is the case for example when an existing group is expanded with switch modules 10 that are not yet paired to a lamp unit 12 and do not yet belong to another group. However, such restrictions on group formation may make it difficult for a person without technical skills to manage group formation.

In another embodiment, lamp units 12 may be configured to adapt their stored ID information upon changes of the ID information in switch modules 10. This can be supported by transmission of information about changes in ID information from switch modules 10. To simplify the lighting control system, switch modules 10 preferably do not need to record which lamp units 12 are paired to them, but when it is desired to preserve previous pairing between lamp units 12 and (groups of) switch modules 10 lamp units 12 may be configured to adapt themselves to group formation. To support group formation, the processor circuit 102 of each switch module 10 is preferably configured to cause transceiver 106 to transmit an update message with the old ID information from memory 104 and the new ID information, each time when the ID information in memory 104 is changed. Lamp units 12 may be configured to change the ID information in memory 126 in response to reception of an update message by receiver 128, if the old ID information in memory 126 matches the old ID information in the update message. In this case, processing circuit 124 changes the ID information in memory 126 according to the new ID information from the update message. This makes it possible to adjust the ID information without affecting pairing of switch modules 10 and lamp units 12.

In an embodiment switch modules 10 also provide for leaving a group. A further sensor may be provided in the switch module to trigger a process for leaving the group. In another embodiment processing circuit 102 may be configured to detect a predetermined pattern of actuation of sensor 100 (e.g. touching sensor 100 for more than a predetermined time period. or touching it with a pattern of long and short touches) in order to trigger leaving. In an embodiment wherein the switch module 10 has multiple sensors, for example to detect commands to switch a light on and off respectively, a combined pattern of actuations may be detected to trigger the process of leaving the group. If detection of a pattern of actuation is also used to trigger joining of groups, detection of mutually different patterns is preferably used for detecting joining and leaving. In principle, a switch module 10 leaves a group when its processing circuit 102 changes the ID information in memory 104 in response to a trigger to leave the group. However, it may be desirable to prevent that empty groups occur, or special action may be desirable when only one switch module remains in a group. In embodiment empty groups may be avoided and the ID information may be changed when only one switch module remains in a group.

In an embodiment the processing circuit 102 of a switching module is configured to cause transceiver 106 to transmit a "leave message", identifying the group ID information from memory 104 in response to the trigger to leave the group. The processing circuit 102 of each switch module 10 may be configured to cause transceiver 106 to transmit a "goodbye message" in response to reception of a "leave message", if the ID information from the leave message matches the ID information in memory 104 of the switch module 10. In turn, processing circuit 102 of the original switch module 10 that sent the leave message may detect reception of the goodbye messages and it may disable changing of its ID information if no goodbye messages are received. Thus empty groups are prevented.

In another embodiment, switch modules 10 may be configured to keep a count of the members of the group to which they belong, to disable leaving the group if the count is one (no other members). The count in switch module 10 with ID information of a group may be updated each time when the transceiver 106 of the switch module 10 detects that another switch module 10 signals that it joins or leaves the group with that ID information. Furthermore, when ID information of a group is transmitted for use to change the ID information in another switch module 10, the count of switch modules 10 in the group with the ID information of the group may be sent along. When the ID information in a switch module 10 is changed using such ID information, the count transmitted along with the ID information may be used to initialize the count in that switch module 10. When an update message is used to signal a merger between groups the counts associated with a sum of the count for the old and new ID information, or the counts for the old and/or new groups may be included. In response to reception of the update messages the count of the merged group may be determined from the message and used to set the count in the switch modules 10 of the merged group.

In an embodiment, each switch module 10 is provided with intrinsic ID information that is particular for the switch module 10. Switch module 10 may be configured to use this intrinsic ID information as ID information by the switch module 10 before the switch module 10 has joined a group or after leaving a group, for example by copying the intrinsic ID information to the memory location for the ID information. In an embodiment it is avoided that the intrinsic ID information is used as group ID information, as this might make it impossible to remove a switch module 10 from a group if its intrinsic ID information serves as group ID information. In an embodiment, the group ID information selection protocol provides for a step of selecting a proposed group ID information only from non-intrinsic ID information used by any one of the switch modules in the proposed group, and by generating a new group ID information if all switch modules 10 in the group still use their intrinsic ID information.

Although embodiments have been shown wherein messages are transmitted once, it should be appreciated that switch modules may repeat transmission of messages in order to reduce the risk that messages are not properly received. Although an embodiment with only switch modules 10 and lamp units 12 has been described, it should be appreciated that other types of device may participate in the system. Furthermore, although an embodiment has been described that does not require a central communication unit, it should be appreciated that such a central communication unit may be used, for example to relay messages between switch modules 10 or between switch modules 10 and lamp units 12. A central communication unit may be used to issue group ID information values as part of a group ID selection protocol.

A switch module 10 may be provided with an integrated circuit comprising transceiver 106, memory 104 and processing circuit 102. In a further embodiment these may be integrated with at least part of sensor 100. Processing circuit 102 and/or processing circuit 124 may be implemented by means of a programmable microprocessor circuit and a program memory comprising a program of instructions to make the processing circuit perform the functions as described. When it is stated herein that a processing circuit is configured to perform a specified function, this means that the processing circuit is a programmable circuit provided with a program that, when executed, will cause processing circuit to perform this function, or that the processing circuit is a dedicated logic circuit with a circuit structure that will cause this function to be executed.

An example has been shown wherein each switch module 10 transmits messages as soon as possible after detection of actuation of the sensor 100, in order to use temporal proximity of actuation of sensors of different switch modules 10 as a trigger to unite the switch modules in a group. However, temporal proximity can be used also without quick transmission. In an embodiment the time counters of switch modules may be synchronized (e.g. by synchronization to a central clock time signal) and processing circuit 102 may sample a time stamps obtained from the time counter at the time of detection of actuation of the sensor. In this embodiment the time stamp may be sent along with a message in response to the actuation, so that the temporal proximity of actuation of the sensors may be detected by comparing time stamps rather than indirectly comparing time values of actuation by comparing time counter values of the time points of receiving messages.

Although examples have been shown wherein the ID information from memory 104 is included in the messages, it should be appreciated that this is only one example of how ID information for use in the messages may be derived from ID information in the memory. For example, ID information for use in the messages may be derived by combining other information with ID information in the memory, or by using the ID information from the memory as an argument of a function to compute the ID information for use in the messages etc.

Lamp units 12 may be configured to process messages from switch modules 10 in various ways. In one embodiment lamp units may be configured to toggle lamps on or off. In this way a group serves to toggle lamp status from different positions in a house.

In another embodiment processing circuits 102 of switch modules 10 may be configured to identify state information (such as on/off, or required current or intensity levels) in the messages. A lamp unit 12 may provide for switching to a state that is identified in a received message (an on state or an off state, or a state with a specified current level or intensity setting) for example, the processing circuit 124 controlling the current control device 122 to switch the current to the light producing device 120 to the state specified in the message when the ID information matches. In another embodiment, messages may identify a change of state. A lamp unit 12 may provide for increasing or decreasing supply current to the light producing device in response to a message with matching ID information and change of state information for example. Because different switch modules may use the same ID information, actuation of arbitrary switch modules 10 from a group can be used to set the state in the same lamp unit 12.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A switch module for use in a lighting system, the switch module comprising:
   a sensor, including circuitry, configured and arranged for sensing control operation of the switch module by a user;
   a transceiver for transmitting and receiving messages via a communication medium;
   a memory for storing an ID information value; and
   a processing circuit coupled to the sensor, the transceiver and the memory, and configured to cause the transceiver to transmit lamp control messages comprising ID information derived from the ID information value in the memory, in response to sensing of the user control operation by the sensor, the processing circuit being furthermore configured to detect reception, by the transceiver, of a message reporting user control operation of a further sensor of a further switch module, the message including ID information of the further switch module, wherein the processing circuit is configured to determine whether a time interval between a user control operation of the one sensor of the switch module and a time point associated with said message reporting the user control operation has a duration below a threshold, and to cause the ID information value in the memories of the switch module and the further switch module from which the ID information in the message is derived to acquire matching values when said duration lies below the threshold, wherein the matching values are derived based on the ID information of the switch module and the ID information of the further switch module.

2. A switch module according to claim 1, wherein the ID information value and the matching values identify a lamp that is controlled by the switch module and the further switch module by sending a lamp control message from one of the switch module and the further switch module to the lamp, and the processing circuit is configured to control operation of the lamp by sending a lamp control message from the switch module to the lamp, the lamp control message including the matching value, distinguish detection of a first and second type of detected user control operation, indicating commands for lamp control and acquiring matching ID information values respectively, the processing circuit being configured to cause the ID information value in the memories of the switch module and the further switch module to acquire matching values when the user control operation for which said duration lies below the threshold is of the second type, and to control the lamp by causing the transceiver to transmit lamp control messages including the ID information value.

3. A switch module according to claim 2, wherein the processing circuit is configured to distinguish detection of a first and second type of detected user control operation, indicating commands for lamp control and acquiring matching ID information values respectively, the processing circuit being configured to cause the transceiver to transmit a lamp control message or a join request message that are distinguishable from each other, selectively in response to detections of user control operations of the first and second type respectively.

4. A switch module according to claim 3, wherein the processing circuit is configured to cause the ID information value in the memories of the switch module and the further switch module to acquire matching values selectively when the message reporting the user control operation for which said duration lies below the threshold is a join request message distinguished from a lamp control message.

5. A switch module according to claim 1, wherein the processing circuit is configured to transmit a further message in response to said user control operation of the sensor of the switch module, and to execute a group ID information selection protocol designed to select a proposed ID value dependent on inherent properties of the further message and the message reporting user control operation of the further sensor of the further switch module, and to set the ID information value in the memory of the switch module according to the proposed ID value, at least if the proposed ID value differs from a previous ID information value in the memory.

6. A switch module according to claim 5, wherein the processing circuit is configured to monitor reception of messages to detect instances where a plurality of switch modules have sent messages in a time interval with a duration below said threshold, to compare ID information from the messages involved in a detected instance with the ID information from the memory, to execute the ID information value selection protocol when the ID information from the memory matches ID information in the messages involved in the detected instance, and to update the ID information value in the memory according to a result of the ID information value selection protocol.

7. A switch module according to claim 1, wherein the processing circuit is configured to copy data from ID information transmitted by the further switch module into the memory when said duration lies below the threshold, to a location used to derive the ID information to be included in subsequent ones of the lamp control messages.

8. A switch module according to claim 1, wherein the processing circuit is configured to cause the transceiver to transmit an update message identifying a previous ID information value and a new matching ID information value of at least one of the switch module and the further switch module that is matched to the ID information value of another of the at least one switch module and the further switch module, when the previous ID information value and the new matching ID information value are mutually different.

9. A switch module according to claim 1, wherein the processing circuit is configured to determine whether the transceiver has received an update message identifying a first and second ID information value, to compare the first ID information value with the ID information value in the memory and to replace the ID information value in the memory by the second ID information value when the first ID information value and the ID information value match with each other.

10. A switch module according to claim 1, wherein the processing circuit is configured to detect a command to make the switch module leave a group defined by the ID information value in the memory, and to respond to said command by changing the ID information value in the memory.

11. A switch module according to claim 10, wherein the processing circuit is configured to determine a count of switch modules in the group and to disable said changing when the count indicated that the switch module is alone in the group.

12. A lighting control system, comprising a switch module according to claim 1 and at least one lamp unit configured to respond to the lamp control messages from the switch module selectively when the ID information in the lamp control messages matches a further ID information value in the lamp unit, the lamp unit being configured to make the further ID information value track changes of the ID information value of the switch module.

13. A lighting control system, according to claim 12, wherein the lamp unit is configured to set the further ID information value initially according to ID information in a first lamp control message received after a trigger event in the lamp control unit.

14. A lamp unit for use in a lighting control system with the switch module according to claim 1, the lamp unit comprising a memory, a receiver and a processing circuit coupled to the memory and the receiver, the processing circuit of the lamp unit being configured to execute lamp control operations in response to the lamp control messages when the ID information from the lamp control messages matches an ID information value stored in the memory of the lamp unit, characterized in that the processing circuit is configured to change the ID information value stored in the memory of the lamp unit in response to the update message according to new ID information in the update message when previous ID information in the update message matches the ID information value stored in the memory of the lamp control unit and/or to change the ID information value in response to detection of instances where a plurality of switch modules have sent messages in a time interval with a duration below said threshold, if the ID information from the memory matches ID information in the messages involved in the detected instance.

15. A switch module according to claim 1, wherein:
the memory is configured and arranged to store the ID information value of the switch module;
the processing circuit is further configured to
select the matching value for the ID information value of the switch module and the further switch module based on data the message reporting user control operation; and
cause the ID information value in the memories of the switch module and the further switch module from which the ID information in the message is derived to store the selected matching values when said duration lies below the threshold.

16. A method of controlling a lamp unit from mutually separated switch modules in a lighting control system, wherein the lamp unit responds selectively to messages from the switch modules when the messages comprise ID information matching with ID information stored in the lamp unit, the method comprising
detecting user control operation of sensors in the switch modules;
transmitting messages from the switch modules in response to user control operation of sensors in the switch modules;
setting the ID information value in memories of the switch module and/or the further switch module;
using the ID information values from the memories of the switch module and/or the further switch module in the messages to the lamp unit;
determining, in at least one of the switch modules, from at least one of the messages from a further one of the switch modules, whether a first time point of the user control operation in said further one of the switch modules is separated from a second time point of user control operation in said at least one of the switch modules by a time interval with a duration that is less than a predetermined threshold;
determining matching ID information based on the ID information value of the switch module and the ID information value of the further switch module, wherein the ID information value of the further switch module is received by the switch module in a message from the further switch module; and
providing for matching ID information values in the switch module and/or the further switch module when said duration lies below the predetermined threshold, the matching ID information values being used in the messages to the lamp unit to identify and control operation of the lamp unit by the switch module and/or the further switch module.

17. A method according to claim 16, further including selecting matching ID information values of the switch module and the further switch module based on data in one of the messages transmitted in the time interval.

18. A method according to claim 16, further comprising:
transmitting, using the switch module, a changed matching ID information value and the matching ID information value to switches in a group associated with the matching ID information value, the switches including the further switch module; and
storing, at each of the switches in the group, the changed matching ID information value.

19. A method according to claim 16, further comprising selecting matching ID information values of the switch module and the further switch module based on data in one of the messages that is passed between the switch module and the further switch module; and
storing the selected matching ID information values in the switch module and in the further switch module in response to said duration lying below the predetermined threshold, and using the selected matching ID information values in the messages to the lamp unit.

\* \* \* \* \*